(12) United States Patent
Nie et al.

(10) Patent No.: US 10,977,781 B2
(45) Date of Patent: Apr. 13, 2021

(54) METHOD, DEVICE AND SYSTEM FOR IMAGE FUSION (71) Applicant: Hangzhou Hikvision Digital Technology Co., Ltd., Zhejiang (CN)

(72) Inventors: Xinxin Nie, Zhejiang (CN); Lihong Luo, Zhejiang (CN); Meng Fan, Zhejiang (CN); Hai Yu, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 177 days.

(21) Appl. No.: 16/331,009

(22) PCT Filed: May 31, 2017

(86) PCT No.: PCT/CN2017/086559
§ 371 (c)(1),
(2) Date: Mar. 6, 2019

(87) PCT Pub. No.: WO2018/064894
PCT Pub. Date: Apr. 12, 2018

(65) Prior Publication Data
US 2019/0188838 A1 Jun. 20, 2019

(30) Foreign Application Priority Data

Oct. 8, 2016 (CN) .......................... 201610874997.2

(51) Int. Cl.
*G06K 9/00* (2006.01)
*G06T 5/50* (2006.01)
(Continued)

(52) U.S. Cl.
CPC ................ *G06T 5/50* (2013.01); *G06T 5/002* (2013.01); *H04N 5/332* (2013.01);
(Continued)

(58) Field of Classification Search
CPC .. H04N 5/332; H04N 5/217; H04N 2209/047; G06T 2207/10024;
(Continued)

(56) References Cited

U.S. PATENT DOCUMENTS 8,345,936 B2  1/2013 Burge et al.
2006/0132642 A1* 6/2006 Hosaka ............... H04N 5/23229
                                                        348/370

(Continued)

FOREIGN PATENT DOCUMENTS

CN      102075683 A    5/2011
CN      103116741 A    5/2013
(Continued)

OTHER PUBLICATIONS

Yin et al., Fusion of noisy infrared and visible images based on anisotropic bivariate shrinkage, Infrared Physics & Technology, vol. 54, Issue 1, Jan. 2011, pp. 13-20.

*Primary Examiner* — Li Liu
(74) *Attorney, Agent, or Firm* — Bret E. Field; Bozicevic, Field & Francis LLP (57) ABSTRACT

The present disclosure discloses an image fusion method, device and system. The image fusion method comprises: obtaining a visible light image generated by a visible light sensor and an invisible light image generated by an invisible light sensor, wherein there is a correspondence between the visible light image and the invisible light image; synthesizing the visible light image and the invisible light image to create a first synthetic image; denoising the visible light image and the first synthetic image; and fusing the denoised visible light image and the denoised first synthetic image to generate a second synthetic image. In embodiments of the present disclosure, the visible light image and the first synthetic image that is fused with the invisible light image
(Continued)

are denoised respectively before the final image fusion to denoising the fused image.

12 Claims, 3 Drawing Sheets

(51) Int. Cl.
*G06T 5/00* (2006.01)
*H04N 5/33* (2006.01)

(52) U.S. Cl.
CPC .............. *G06T 2207/10024* (2013.01); *G06T 2207/10048* (2013.01); *G06T 2207/20221* (2013.01)

(58) Field of Classification Search
CPC .......... G06T 2207/10048; G06T 5/002; G06T 2207/20221; G06T 2207/20024; G06K 9/2018; G06K 9/00255
See application file for complete search history.

(56) References Cited

U.S. PATENT DOCUMENTS

| | | | | |
|---|---|---|---|---|
| 2007/0183657 | A1* | 8/2007 | Kidono | H04N 9/67 382/162 |
| 2008/0284880 | A1* | 11/2008 | Numata | H04N 5/217 348/241 |
| 2010/0103268 | A1* | 4/2010 | Tokuyama | H04N 9/77 348/162 |
| 2011/0063451 | A1* | 3/2011 | Kamon | H04N 9/045 348/164 |
| 2013/0250123 | A1* | 9/2013 | Zhang | H04N 5/332 348/164 |
| 2014/0321739 | A1* | 10/2014 | Yang | G06T 5/10 382/162 |
| 2015/0334315 | A1 | 11/2015 | Teich et al. | |
| 2016/0012569 | A1* | 1/2016 | Hanada | G06T 3/4038 382/131 |
| 2017/0318238 | A1* | 11/2017 | Sugiyama | H04N 5/374 |
| 2017/0358067 | A1* | 12/2017 | Jung | G06T 5/003 |
| 2018/0338092 | A1* | 11/2018 | Fan | H04N 9/04 |
| 2019/0124271 | A1* | 4/2019 | Sato | H04N 9/04515 |
| 2019/0147569 | A1* | 5/2019 | Strandemar | G06T 5/003 382/255 |
| 2019/0228512 | A1* | 7/2019 | Kurihara | H04N 9/78 |

FOREIGN PATENT DOCUMENTS

| | | |
|---|---|---|
| CN | 103390281 A | 11/2013 |
| CN | 104683767 A | 6/2015 |
| CN | 105069768 A | 11/2015 |
| CN | 105321172 A | 2/2016 |
| CN | 105989585 A | 10/2016 |
| WO | WO2015157058 A1 | 10/2015 |

\* cited by examiner

METHOD, DEVICE AND SYSTEM FOR IMAGE FUSION

The present application claims the priority to a Chinese patent application No. 201610874997.2 filed with the China National Intellectual Property Administration of People's Republic of China on Oct. 8, 2016 and entitled "METHOD, DEVICE AND SYSTEM FOR IMAGE FUSION", which is incorporated herein by reference in its entirety.

TECHNICAL FIELD

The present disclosure relates to the field of image processing technology, and in particularly, to an image fusion method, device and system.

BACKGROUND

In some actual scenarios, such as scenarios with low light level, in order to ensure that the acquired images contain more image information, it usually needs an image acquisition equipment for light splitting fusion to acquire images. Specifically, the basic principle of the image acquisition equipment for light splitting fusion would include: acquiring a visible light image generated based on visible light signals and an invisible light image generated based on invisible light signals, and fusing the visible light image and the invisible light image to create a fused image. The fused image is a dual-band image, which has more image information than any one of the visible image and the invisible image that are single band images. The invisible light images include near infrared images and infrared images.

The related imaging process may involve: obtaining imaging information including a visible light image and an invisible light image; denoising the visible light image based on the relative magnitude between the visible light image and the invisible light image; and then synthesizing the invisible light image and the denoised visible light image according to a predetermined weight coefficient to generate an image.

However, in the above related imaging process, only the noises in the visible light image may be reduced, while the noises in the invisible light image are ignored. Thus, the denoising is not thorough, with the result that there are still noises in the generated image.

SUMMARY OF THE INVENTION

The embodiments of the disclosure disclose an image fusion method, device and system for denoising the fused images. The specific solutions are as follows.

In one aspect, an embodiment of the present disclosure provides an image fusion method including:

obtaining a visible light image generated by a visible light sensor and an invisible light image generated by an invisible light sensor, wherein there is a correspondence between the visible light image and the invisible light image;

synthesizing the visible light image and the invisible light image to create a first synthetic image;

denoising the visible light image and the first synthetic image; and fusing the denoised visible light image and the denoised first synthetic image to generate a second synthetic image.

Optionally, after denoising the visible light image and the first synthetic image, the method further includes:

filtering the denoised visible light image and the denoised first synthetic image respectively;

fusing the denoised visible light image and the denoised first synthetic image to generate a second synthetic image comprises:

fusing the filtered visible light image and the filtered first synthetic image to generate the second synthetic image.

Optionally, filtering the denoised visible light image and the denoised first synthetic image respectively includes:

performing low pass filtering on the denoised visible light image to obtain an image corresponding to low frequency information;

performing high pass filtering on the denoised first synthetic image to obtain an image corresponding to high frequency information;

fusing the filtered visible light image and the filtered first synthetic image to generate the second synthetic image comprises:

fusing the image corresponding to low frequency information and the image corresponding to high frequency information to generate the second synthetic image.

Optionally, synthesizing the visible light image and the invisible light image to create a first synthetic image includes:

synthesizing the invisible light image and the visible light image based on a first weight coefficient corresponding to the invisible light image and a second weight coefficient corresponding to the visible light image to create the first synthetic image.

Optionally, denoising the visible light image and the first synthetic image includes:

determining a denoising control degree value for the visible light image and the first synthetic image according to the visible light image and the first synthetic image; and denoising the visible light image and the first synthetic image respectively based on the determined denoising control degree value.

Optionally, denoising the visible light image and the first synthetic image includes:

determining a denoising control degree value for the visible light image and the first synthetic image according to the first synthetic image; and denoising the visible light image and the first synthetic image respectively based on the determined denoising control degree value.

Optionally, determining a denoising control degree value for the visible light image and the first synthetic image according to the visible light image and the first synthetic image includes:

determining a first denoising weight value based on the visible light image and a preset denoising formula;

determining a second denoising weight value based on the first synthetic image and the preset denoising formula; and determining the denoising control degree value for the visible light image and the first synthetic image based on the first denoising weight value and the second denoising weight value.

Optionally, determining a denoising control degree value for the visible light image and the first synthetic image according to the visible light image and the first synthetic image includes:

obtaining a first gain value of the visible light image and a second gain value of the first synthetic image;

judging whether the difference between the first gain value and the second gain value is greater than a predetermined threshold;

if the difference is not greater than the predetermined threshold, determining a first denoising weight value based on the visible light image and a preset denoising formula, determining a second denoising weight value based on the first synthetic image and the preset denoising formula, and determining a denoising control degree value for the visible light image and the first synthetic image based on the first denoising weight value and the second denoising weight value; and if the difference is greater than the predetermined threshold, determining the second denoising weight value based on the first synthetic image and the preset denoising formula, and determining the second denoising weight value as the denoising control degree value for the visible light image and the first synthetic image.

Optionally, determining a denoising control degree value for the visible light image and the first synthetic image according to the first synthetic image includes:

determining a third denoising weight value based on the first synthetic image and the preset denoising formula, and determining the third denoising weight value as the denoising control degree value for the visible light image and the first synthetic image.

Optionally, the preset denoising formula is:

$$\text{weight}_{xy} = e^{\left[\frac{(f_{xy}-f_{ij})^2}{2*\delta_1^2} - \frac{(x-i)^2-(y-j)^2}{2*\delta_2^2}\right]};$$

wherein, $f_{xy}$ represents pixel value of a current pixel in the visible light image or in the first synthetic image to be denoised, x and y represent coordinates of the current pixel; $f_{ij}$ represents pixel value of a pixel in a preset neighborhood of the current pixel, i and j represent coordinates of the pixel in the preset neighborhood of the current pixel; $\delta_1$ and $\delta_2$ represent Gaussian distribution standard deviations.

Optionally, formulas used in denoising the visible light image and the first synthetic image are:

$$W(x, y) = \frac{\sum_{-r}^{r}\sum_{-r}^{r} W(x+i, y+j) * \text{weight}(x+i, y+j)}{\sum_{-r}^{r}\sum_{-r}^{r} \text{weight}(x+i, y+j)};$$

$$VIS(x, y) = \frac{\sum_{-r}^{r}\sum_{-r}^{r} VIS(x+i, y+j) * \text{weight}(x+i, y+j)}{\sum_{-r}^{r}\sum_{-r}^{r} \text{weight}(x+i, y+j)};$$

wherein, r represents the radius of the preset neighborhood; W(x, y) represents the denoised first synthetic image, VIS(x, y) represents the denoised visible light image; x and y represent coordinates of a current pixel in the visible light image or in the first synthetic image to be denoised, W(x+i, y+j) represents pixel value of a pixel in the preset neighborhood of the current pixel in the first synthetic image; VIS(x+i, y+j) represents pixel value of a pixel in the preset neighborhood of the current pixel in the visible light image; weight(x+i, y+j) represents the denoising control degree value for the current pixel in the visible light image or in the first synthetic image.

In another aspect, an embodiment of the present disclosure provides an image fusion device including: an obtaining module, a synthesis module, a denoising module and a fusion module;

the obtaining module is configured to obtain a visible light image generated by a visible light sensor and an invisible light image generated by an invisible light sensor, wherein there is a correspondence between the visible light image and the invisible light image;

the synthesis module is configured to synthesize the visible light image and the invisible light image to create a first synthetic image;

the denoising module is configured to denoise the visible light image and the first synthetic image;

the fusion module is configured to fuse the denoised visible light image and the denoised first synthetic image to generate a second synthetic image.

Optionally, the device further includes a filtering module;

the filtering module is configured to filter the denoised visible light image and the denoised first synthetic image respectively after denoising the visible light image and the first synthetic image; and wherein, the fusion module is configured to fuse the filtered visible light image and the filtered first synthetic image to generate the second synthetic image.

Optionally, the filtering module includes a first filtering unit and a second filtering unit;

the first filtering unit is configured to perform low pass filtering on the denoised visible light image to obtain an image corresponding to low frequency information;

the second filtering unit is configured to perform high pass filtering on the denoised first synthetic image to obtain an image corresponding to high frequency information; and wherein, the fusion module is configured to fuse the image corresponding to low frequency information and the image corresponding to high frequency information to generate the second synthetic image.

Optionally, the synthesis module is specifically configured to synthesize the invisible light image and the visible light image based on a first weight coefficient corresponding to the invisible light image and a second weight coefficient corresponding to the visible light image to create the first synthetic image.

Optionally, the denoising module includes a first determining unit and a first denoising unit;

the first determining unit is configured to determine a denoising control degree value for the visible light image and the first synthetic image according to the visible light image and the first synthetic image; and the first denoising unit is configured to denoise the visible light image and the first synthetic image respectively based on the determined denoising control degree value.

Optionally, the denoising module includes a second determining unit and a second denoising unit;

the second determining unit is configured to determine a denoising control degree value for the visible light image and the first synthetic image according to the first synthetic image; and the second denoising unit is configured to denoise the visible light image and the first synthetic image respectively based on the determined denoising control degree value.

Optionally, the first determining unit includes a first determining subunit, a second determining subunit, and a third determining subunit;

the first determining subunit is configured to determine a first denoising weight value based on the visible light image and a preset denoising formula;

the second determining subunit is configured to determine the second denoising weight value based on the first synthetic image and the preset denoising formula; and the third determining subunit is configured to determine a denoising control degree value for the visible light image and the first synthetic image based on the first denoising weight value and the second denoising weight value.

Optionally, the first determining unit includes an obtaining subunit, a judging subunit, a fourth determining subunit, and a fifth determining subunit;

the obtaining subunit is configured to obtain a first gain value of the visible light image and a second gain value of the first synthetic image;

the judging subunit is configured to judge whether the difference between the first gain value and the second gain value is greater than a predetermined threshold;

if the difference is not greater than the predetermined threshold, triggering the fourth determining subunit; if the difference is greater than the predetermined threshold, triggering the fifth determining subunit;

the fourth determining subunit is configured to determine a first denoising weight value based on the visible light image and a preset denoising formula, determine a second denoising weight value based on the first synthetic image and the preset denoising formula, and determine a denoising control degree value for the visible light image and the first synthetic image based on the first denoising weight value and the second denoising weight value; and the fifth determining subunit is configured to determine the second denoising weight value based on the first synthetic image and the preset denoising formula, and determine the second denoising weight value as the denoising control degree value for the visible light image and the first synthetic image.

Optionally, the second determining unit is specifically configured to determine a third denoising weight value based on the first synthetic image and the preset denoising formula, and determining the third denoising weight value as the denoising control degree value for the visible light image and the first synthetic image.

Optionally, the preset denoising formula is:

$$weight_{xy} = e^{\left[\frac{(f_{xy}-f_{ij})^2}{2*\delta_1^2} - \frac{(x-i)^2+(y-j)^2}{2*\delta_2^2}\right]};$$

wherein, $f_{xy}$ represents pixel value of a current pixel in the visible light image or in the first synthetic image to be denoised, x and y represent coordinates of the current pixel; $f_{ij}$ represents pixel value of a pixel in a preset neighborhood of the current pixel, i and j represent coordinates of the pixel in the preset neighborhood of the current pixel; $\delta_1$ and $\delta_2$ represent Gaussian distribution standard deviations.

Optionally, formulas used in denoising the visible light image and the first synthetic image are:

$$W(x, y) = \frac{\sum_{-r}^{r}\sum_{-r}^{r} W(x+i, y+j) * weight(x+i, y+j)}{\sum_{-r}^{r}\sum_{-r}^{r} weight(x+i, y+j)};$$

$$VIS(x, y) = \frac{\sum_{-r}^{r}\sum_{-r}^{r} VIS(x+i, y+j) * weight(x+i, y+j)}{\sum_{-r}^{r}\sum_{-r}^{r} weight(x+i, y+j)};$$

wherein, r represents the radius of the preset neighborhood; W(x, y) represents the denoised first synthetic image, VIS(x, y) represents the denoised visible light image; x and y represent coordinates of a current pixel in the visible light image or in the first synthetic image to be denoised, W(x+i, y+j) represents pixel value of a pixel in the preset neighborhood of the current pixel in the first synthetic image; VIS(x+i, y+j) represents pixel value of a pixel in the preset neighborhood of the current pixel in the visible light image; weight(x+i, y+j) represents the denoising control degree value for the current pixel in the visible light image or in the first synthetic image.

In another aspect, an embodiment of the present disclosure provides an image fusion system, including: a visible light sensor, an invisible light sensor, and a processor; wherein, the visible light sensor is used for acquiring visible light signals and generating a visible light image based on the visible light signals;

the invisible light sensor is used for acquiring invisible light signals and generating an invisible light image based on the invisible light signals;

the processor is used for obtaining a visible light image generated by a visible light sensor and an invisible light image generated by an invisible light sensor, wherein there is a correspondence between the visible light image and the invisible light image; synthesizing the visible light image and the invisible light image to create a first synthetic image; denoising the visible light image and the first synthetic image; and fusing the denoised visible light image and the denoised first synthetic image to generate a second synthetic image.

In another aspect, an embodiment of the present disclosure provides an electronic device, including: a housing, a processor, a memory, a circuit board and a power supply circuit, wherein, the circuit board is arranged inside a space enclosed by the housing, the processor and the memory are arranged on the circuit board; the power supply circuit is configured to supply power for various circuits or elements of the electronic device; the memory is configured to store executable program codes; the processor performs the following steps by executing the executable code stored on the memory:

obtaining a visible light image generated by a visible light sensor and an invisible light image generated by an invisible light sensor, wherein there is a correspondence between the visible light image and the invisible light image;

synthesizing the visible light image and the invisible light image to create a first synthetic image;

denoising the visible light image and the first synthetic image; and fusing the denoised visible light image and the denoised first synthetic image to generate a second synthetic image.

In another aspect, an embodiment of the present disclosure provides executable program codes, which are executed to implement the image fusion method provided by the embodiments of the present disclosure.

In another aspect, an embodiment of the present disclosure provides a storage medium for storing executable program codes, which are executed to implement the image fusion method provided by the embodiments of the present disclosure.

In the embodiments of the present disclosure, a visible light image generated by a visible light sensor and an invisible light image generated by an invisible light sensor are obtained, wherein there is a correspondence between the visible light image and the invisible light image; a first synthetic image is created by synthesizing the visible light image and the invisible light image; the visible light image and the first synthetic image are denoised; and the denoised visible light image and the denoised first synthetic image are fused to generate a second synthetic image. Thus, the visible light image and the first synthetic image that is fused with the invisible light image are denoised respectively before the final image fusion to denoise the fused image. It should be understood that any product or method for implementing the embodiments of the present disclosure does not necessarily require all of the advantages described above.

BRIEF DESCRIPTION OF THE DRAWINGS

In order to explain the technical solutions of embodiments of the present disclosure or of related art, a simple introduction of the drawings required in the description of the embodiments and of related art will be given. Obviously, the drawings described below are just those of some embodiments of the present disclosure and other drawings may be obtained by those of ordinary skills in the art without any creative efforts based on these drawings.

DETAILED DESCRIPTION OF THE INVENTION

The technical solutions of the present disclosure will be described in detail with reference to the drawings of embodiments of the present disclosure. Obviously, the embodiments described are merely some of the embodiments of the present disclosure, instead of all the embodiments. All other embodiments obtained by those of ordinary skills in the art based on the embodiments herein without any creative efforts are within the scope of the present disclosure.

The embodiments of the present disclosure disclose an image fusion method, device and system for denoising the fused images.

First, an image fusion method provided by the embodiment of the present disclosure will be described.

It will be understood that the image fusion method provided by the embodiment of the present disclosure can be applied to cameras or any other devices that can acquire and process images.

Figure 1:
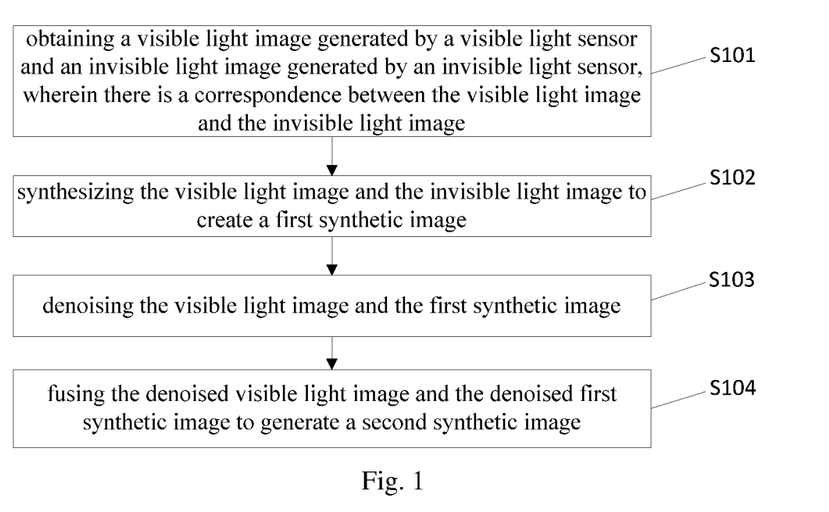
FIG. 1 is a schematic flow diagram of an image fusion method according to an embodiment of the present disclosure.

As shown in FIG. 1, an image fusion method provided by the embodiment of the present disclosure may include the steps of:

S101: obtaining a visible light image generated by a visible light sensor and an invisible light image generated by an invisible light sensor, wherein there is a correspondence between the visible light image and the invisible light image.

The acquired optical signals can be separated into visible light signals and invisible light signals by an image acquisition equipment for light splitting fusion. The separated visible light signals are photographed by the visible light sensor to generate the visible light image. In addition, it is also possible to acquire, by a visible light sensor of an image acquisition equipment, visible light signals from optical signals which are then photographed to generate a visible light image, and to acquire, by an invisible light sensor of the image acquisition equipment, invisible light signals from optical signals which are then photographed to generate an invisible light image. The invisible light images include near infrared images and infrared images. Near infrared refers to the infrared shortwave with a wavelength typically between 780 nm and 1100 nm. The invisible light image can be represented by NIR.

The way of acquiring the visible light signals and the invisible light signals and of generating the visible light image and the invisible light image will not be limited herein.

S102: synthesizing the visible light image and the invisible light image to create a first synthetic image.

Compared to the individual visible light image or the invisible light image, the image energy of the first synthetic image, which is created by synthesizing the visible light image and the invisible light image in this step, is enhanced, and the texture information in the first synthetic image is also increased accordingly. Due to the enhancement of the image energy, the interference caused by the noises to the first synthetic image is correspondingly reduced.

As an implementation of the embodiment of the present disclosure, the visible light image and the invisible light image can be synthesized linearly, wherein, synthesizing the visible light image and the invisible light image to create a first synthetic image may include:

synthesizing the invisible light image and the visible light image based on a first weight coefficient corresponding to the invisible light image and a second weight coefficient corresponding to the visible light image to create the first synthetic image.

Optionally, the formula used in creating the first synthetic image is:

$$W = NIR * K_1 + VIR * K_2;$$

wherein, W represents the first synthetic image, NIR represents the invisible light image, VIR represents the visible light image, and $K_1$ and $K_2$ respectively represent a first weight coefficient that is preset for the invisible light image and a second weight coefficient that is preset for the visible light image.

That is, $K_1$ can represent a first weight coefficient that is preset for the invisible light image, and $K_2$ can represent a second weight coefficient that is preset for the visible light image.

The first weight coefficient $K_1$ and the second weight coefficient $K_2$ can be adjusted according to the quality of the invisible light image and of the visible light image. It will be understood that the quality of the invisible light image and of the visible light image are determined by using the related techniques. When the quality of the visible light image is relatively good, the value of the weight coefficient $K_2$ can be appropriately increased, and when the quality of the invisible light image is relatively good, the value of the weight coefficient $K_1$ can be appropriately increased.

When synthesizing the images, the invisible light image and the visible light image can be synthesized pixel by pixel. It should be addressed that the implementation of creating the first synthetic image based on the visible light image and the invisible light image described above is merely an example and is not intended to limit the embodiments of the present disclosure.

S103: denoising the visible light image and the first synthetic image.

It will be understood that texture information formed by objects in different spectra is different, and that the interference of the noise to the visible light image or to the invisible light image is more than that to the first synthesized image created based on the visible light image and the invisible light image. Therefore, if only the visible light image is denoised or only the invisible light image is denoised respectively, much texture information will be filtered out, and the subsequently created image will lose more texture information.

In this step, jointing the visible light image with the first synthetic image that is fused with the invisible light image, the visible light image and the first synthetic image are denoised respectively, which can reduce the loss of texture information during denoising images to a certain extent.

In other words, in this step, the visible light image and the first synthetic image denoised respectively, in considering the visible light image and the first synthetic image that is fused with the visible light image and the invisible light image, which can reduce the loss of texture information during denoising images to a certain extent.

As an implementation of the embodiment of the present disclosure, denoising the visible light image and the first synthetic image may include:

determining a denoising control degree value for the visible light image and the first synthetic image according to the visible light image and the first synthetic image; and denoising the visible light image and the first synthetic image respectively based on the determined denoising control degree value.

As for the determined denoising control degree value, not only the texture information in the visible light image but also the texture information in the invisible light image are taken into account, which can achieve better denoising of the visible light image and the first synthetic image.

As an implementation of the embodiment of the present disclosure, determining a denoising control degree value for the visible light image and the first synthetic image according to the visible light image and the first synthetic image may include:

determining a first denoising weight value based on the visible light image and a preset denoising formula;

determining a second denoising weight value based on the first synthetic image and the preset denoising formula; and determining the denoising control degree value for the visible light image and the first synthetic image based on the first denoising weight value and the second denoising weight value.

It should be noted that the denoising control degree value for the visible light image and the first synthetic image is determined based on the visible light image, a preset denoising formula and the first synthetic image. The visible light image and the first synthetic image are then denoised respectively based on the determined denoising control degree value. When determining the denoising control degree value based on the first denoising weight value and the second denoising weight value, the denoising control degree value can be directly determined as the mean value of the first denoising weight value and the second denoising weight value. The denoising control degree value can be calculated in other ways, and is not limited thereto.

In addition, it should be addressed that the terms "first" in "the first denoising weight value", "second" in "the second denoising weight value", and "third" in "the third denoising weight value" described hereafter are only used to distinguish among different denoising weight values, and do not have any limited relationships.

As another implementation of the embodiment of the present disclosure, as in the related art, after the visible light image is obtained by the image fusion device and the first synthetic image is input, the device returns two gain values corresponding to the visible light image and the first synthetic image respectively, wherein the visible light image may correspond to the first gain value, and the first synthetic image may correspond to the second gain value. These two gain values represent the image quality of corresponding images respectively. The smaller the gain value, the better the image quality of the corresponding image. When there's not much difference between quality of the visible light image and that of the first synthetic image, the denoising control degree value corresponding to the visible light image and the first synthetic image can be determined based on both the visible light image and the first synthetic image, and denoising is performed based on the determined denoising control degree value. When the quality of the first synthetic image is significantly better than that of the visible light image, the denoising control degree value corresponding to the visible light image and the first synthetic image can be determined based on the first synthetic image only, and then denoising is performed based on the determined denoising control degree value.

The determining a denoising control degree value for the visible light image and the first synthetic image according to the visible light image and the first synthetic image includes:

obtaining a first gain value of the visible light image and a second gain value of the first synthetic image;

judging whether the difference between the first gain value and the second gain value is greater than a predetermined threshold;

if the difference is not greater than the predetermined threshold, determining a first denoising weight value based on the visible light image and a preset denoising formula, determining a second denoising weight value based on the first synthetic image and the preset denoising formula, and determining a denoising control degree value for the visible light image and the first synthetic image based on the first denoising weight value and the second denoising weight value; and if the difference is greater than the predetermined threshold, determining the second denoising weight value based on the first synthetic image and the preset denoising formula, and determining the second denoising weight value as the denoising control degree value for the visible light image and the first synthetic image.

It indicates that there's not much difference between the quality of the visible light image and that of the first synthetic image, if the difference between the first gain value and the second gain value is less than the predetermined threshold. At this point, the denoising control degree value corresponding to the visible light image and the first synthetic image can be determined based on both the visible light image and the first synthetic image, and denoising is performed based on the determined denoising control degree value.

It indicates that the quality of the first synthetic image is significantly better than the quality of the visible light image, if the difference between the first gain value and the second gain value is greater than or equal to the predetermined threshold. The first synthetic image incorporates the visible light image and the invisible light image. If the quality of the first synthetic image is significantly better than the quality of the visible light image, the denoising control degree value corresponding to the visible image and the first synthetic image can be determined based on only the first synthetic image, which avoids the effect of the visible light image with poor quality on the denoising processing.

Moreover, it will be understood that texture information formed by objects in different spectra is different. If the quality of the visible light image is significantly better than that of the first synthetic image, both the visible light image and the first synthetic image are required to determine the denoising control degree value corresponding to the visible light image and the first synthetic image in order to ensure the representation of the texture information in the invisible image incorporated in the first synthetic image. The denoising is performed based on the determined denoising control degree value.

In addition, the first synthetic image contains both the visible light image and the invisible light image, that is, the first synthetic image contains the texture information formed by the object under the visible light and the texture information formed by the object under the invisible light. Thus, the visible light image and the first synthetic image can be denoised by using only the first synthetic image.

As an implementation of the embodiment of the present disclosure, denoising the visible light image and the first synthetic image may include:

determining a denoising control degree value for the visible light image and the first synthetic image according to the first synthetic image; and denoising the visible light image and the first synthetic image respectively based on the determined denoising control degree value.

As for determining the denoising control degree value based on the first synthetic image, not only the texture information in the visible light image but also the texture information in the invisible light image are taken into account, which can also achieve better denoising of the visible light image and the first synthetic image.

As another implementation of the embodiment of the present disclosure, determining a denoising control degree value for the visible light image and the first synthetic image according to the first synthetic image includes:

determining a third denoising weight value based on the first synthetic image and the preset denoising formula, and determining the third denoising weight value as the denoising control degree value for the visible light image and the first synthetic image.

It will be understood that the third denoising weight value may be equal to the second denoising weight value mentioned above.

As another implementation of the embodiment of the present disclosure, the preset denoising formula may be:

$$weight_{xy} = e^{\left[\frac{(f_{xy}-f_{ij})^2}{2*\delta_1^2} - \frac{(x-i)^2+(y-j)^2}{2*\delta_2^2}\right]};$$

wherein, $f_{xy}$ represents pixel value of a current pixel in the visible light image or in the first synthetic image to be denoised, x and y represent coordinates of the current pixel; $f_{ij}$ represents pixel value of a pixel in a preset neighborhood of the current pixel, i and j represent coordinates of the pixel in the preset neighborhood of the current pixel; $\delta_1$ and $\delta_2$ represent Gaussian distribution standard deviations.

In other words, $f_{xy}$ may represent the visible light image to be denoised, x and y represent coordinates of the current pixel, $f_{ij}$ represents the pixel value of a pixel in a preset neighborhood of the current pixel, i and j represent coordinates of the pixel in the preset neighborhood of the current pixel, $\delta_1$ and $\delta_2$ represent Gaussian distribution standard deviations. At this point, the current pixel is the pixel in the visible light image, and $weight_{xy}$ may represent the first denoising weight value.

In addition, $f_{xy}$ may instead represent the pixel value of a pixel in the first synthetic image, x and y represent coordinates of the current pixel, $f_{ij}$ represents the pixel value of a pixel in a preset neighborhood of the current pixel, i and j represent coordinates of the pixel in the preset neighborhood of the current pixel, $\delta_1$ and $\delta_2$ represent Gaussian distribution standard deviations. At this point, the current pixel is the pixel in the first synthetic image, and $weight_{xy}$ may represent the second denoising weight value or the third denoising weight value.

The above formula corresponds to all the pixels in the visible light image or in the first synthetic image to be denoised. For example, if the visible light image is to be denoised and the radius of the preset neighborhood is 1 (i.e. r described hereafter), as with the related art, a 3*3 sliding window is generated according to the radius 1 of the preset neighborhood, wherein the relationship between the radius of the neighborhood and the generated sliding window is 2r+1=3, and 3 is the side length of the sliding window for the neighborhood. Starting from the left top corner of a 9*9 pixel matrix, the 3*3 sliding window slides from top to bottom and from left to right. The actions of the sliding window are the same as that in the related art.

As with the related art, for the 9 pixels surrounded by the 3*3 sliding window, the pixel at the center is the current pixel $f_{xy}$, and the surrounding 8 pixels are pixels $f_{ij}$ in the preset neighborhood of the current pixel. It will be understood that the pixel values corresponding to the outermost pixels may be determined by using the related art since the above formula is not able to handle the outermost pixels of the pixel matrix.

As to the value of the side length of the preset neighborhood, it is generally set to an odd, and if it is set to an even, a pixel is specified as the current pixel in the preset neighborhood in advance.

It will be understood that two matrices of the same size are obtained by processing the visible light image and the first synthetic image based on the preset denoising formula in the same manner as in the related art, which correspond to a first denoising weight value and a second denoising weight value respectively. When determining the denoising control degree value corresponding to the visible light image and the first synthetic image based on the first denoising weight value and the second denoising weight value, the denoising control degree value corresponding to the visible light image and the first synthetic image can be directly determined as the mean value of the first denoising weight value and the second denoising weight value. Specifically, the obtained two matrices of the same size can be multiplied, the result of which is the denoising control degree value corresponding to the visible light image and the first synthetic image.

As an implementation of the embodiment of the present disclosure, after the denoising control degree value corresponding to the visible light image and the first synthetic image is determined by using the preset denoising formula above, the visible light image and the first synthetic image are denoised respectively based on the determined denoising control degree value. The formulas used in denoising the visible light image and the first synthetic image, are:

$$W(x, y) = \frac{\sum_{-r}^{r}\sum_{-r}^{r} W(x + i, y + j) * \text{weight}(x + i, y + j)}{\sum_{-r}^{r}\sum_{-r}^{r} \text{weight}(x + i, y + j)};$$

$$VIS(x, y) = \frac{\sum_{-r}^{r}\sum_{-r}^{r} VIS(x + i, y + j) * \text{weight}(x + i, y + j)}{\sum_{-r}^{r}\sum_{-r}^{r} \text{weight}(x + i, y + j)};$$

wherein, r represents the radius of the preset neighborhood; W(x, y) represents the denoised first synthetic image, VIS(x, y) represents the denoised visible light image; x and y represent coordinates of a current pixel in the visible light image or in the first synthetic image to be denoised, W(x+i, y+j) represents pixel value of a pixel in the preset neighborhood of the current pixel in the first synthetic image; VIS(x+i, y+j) represents pixel value of a pixel in the preset neighborhood of the current pixel in the visible light image; weight(x+i, y+j) represents the denoising control degree value for the current pixel in the visible light image or in the first synthetic image.

Wherein, weight(x+i, y+j) may be the denoising control degree value determined based on the first denoising weight value and the second denoising weight value, or may be that determined based on the third denoising weight value, wherein the first denoising weight value is determined based on the visible light image and the preset denoising formula, and the second denoising weight value is determined based on the first synthetic image and the denoising formula.

As with the related art, r represents the radius of the preset neighborhood. If r=1, the preset neighborhood is a 3*3 sliding window, the value of i and j may be −1, 0 or 1 respectively; and if r=2, the preset neighborhood is a 5*5 sliding window, the value of i and j may be −2, −1, 0, 1 or 2 respectively.

S104: fusing the denoised visible light image and the denoised first synthetic image to generate a second synthetic image.

In order to generate the second synthetic image, which is the finally fused image, the related art may be used to fuse the denoised visible light image and the denoised first synthetic image.

With the embodiments of the present disclosure, a visible light image generated by a visible light sensor and an invisible light image generated by an invisible light sensor are obtained, wherein there is a correspondence between the visible light image and the invisible light image; a first synthetic image is created by synthesizing the visible light image and the invisible light image; the visible light image and the first synthetic image are denoised; and the denoised visible light image and the denoised first synthetic image are fused to generate a second synthetic image. Thus, the visible light image and the first synthetic image that is fused with the invisible light image are denoised respectively before the final image fusion to denoise the fused image.

Figure 2:
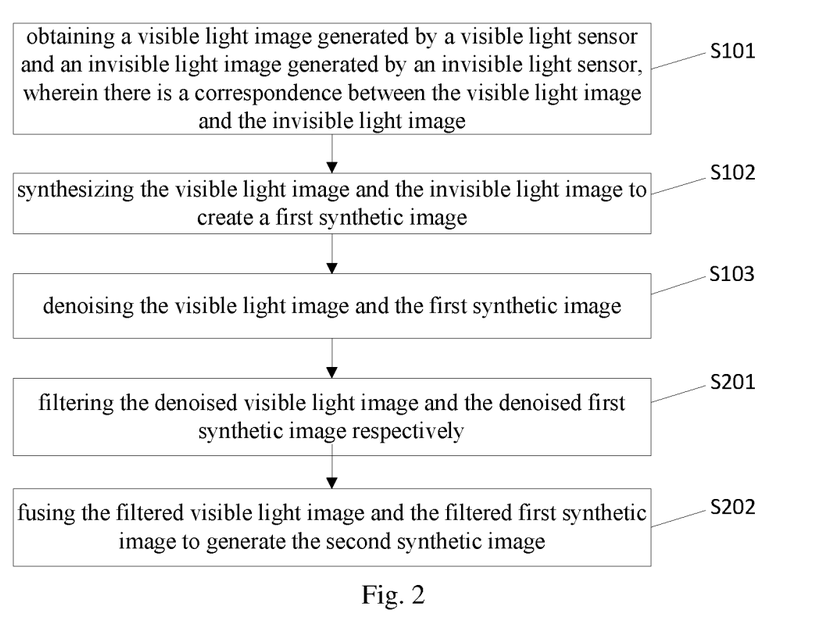
FIG. 2 is another schematic flow diagram of an image fusion method according to an embodiment of the present disclosure.

As an implementation of the embodiment of the present disclosure, in order to obtain a better image, the visible light image and the first synthetic image can be respectively filtered before fusing the denoised visible light image and the denoised first synthetic image. On the basis of the flow shown in FIG. 1, as shown in FIG. 2, after denoising the visible light image and the first synthetic image, the image fusion method provided by the embodiment of the present disclosure may include the steps of:

S201: filtering the denoised visible light image and the denoised first synthetic image respectively;

fusing the denoised visible light image and the denoised first synthetic image to generate a second synthetic image (S104) may include:

S202: fusing the filtered visible light image and the filtered first synthetic image to generate the second synthetic image.

As an implementation of the embodiment of the present disclosure, the contents presented by the visible light image can be perceived by human eyes, mainly presenting the brightness of the image information and color saturation. It is possible to perform low pass filtering on the visible light image to obtain low frequency information. Due to the obtained low frequency information, the fused image has significant brightness and bright colors. Whereas the energy of the pixels in the edge portion of the first synthetic image is stronger than the energy of the pixels in the visible light image itself. It is possible to perform high pass filtering on the first synthetic image to obtain high frequency information. Due to the obtained high frequency information, the edge portion of the fused image is clearer. Specifically, filtering the denoised visible light image and the denoised first synthetic image respectively includes:

performing low pass filtering on the denoised visible light image to obtain an image corresponding to low frequency information;

performing high pass filtering on the denoised first synthetic image to obtain an image corresponding to high frequency information;

fusing the filtered visible light image and the filtered first synthetic image to generate the second synthetic image comprises:

fusing the image corresponding to low frequency information and the image corresponding to high frequency information to generate the second synthetic image.

It will be understood that the low frequency information is primarily a measure of the intensity of the image, and the high frequency information is primarily a measure of the edge and contour of the image. The visible light image mainly presents the brightness and color saturation of the image, and the brightness and color saturation are not affected by invisible light signals. Therefore, the low frequency information of the visible light image can be obtained by filtering. Whereas the energy of pixels in the edge portion of the first synthetic image is stronger than the energy of pixels in the visible light image itself. Compared to the visible light image, the edge and contour of the first synthetic image are better presented. Therefore, the image corresponding to the high frequency information in the first synthetic image can be obtained by filtering. The obtained image corresponding to low frequency information and the image corresponding to high frequency information are then fused to generate the second synthetic image.

Figure 3:
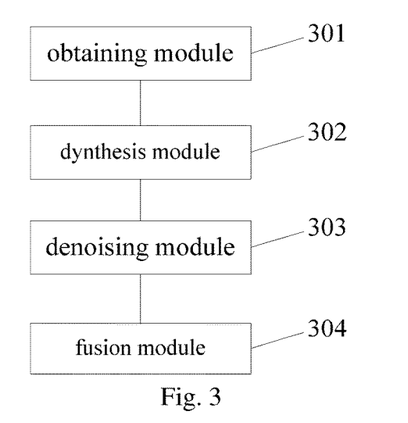
FIG. 3 is a schematic structure diagram of an image fusion device according to an embodiment of the present disclosure.

Corresponding to the embodiment of the method described above, an embodiment of the present disclosure further provides an image fusion device as shown in FIG. 3, the image fusion device may include: an obtaining module 301, a synthesis module 302, a denoising module 303 and a fusion module 304;

the obtaining module 301 is configured to obtain a visible light image generated by a visible light sensor and an invisible light image generated by an invisible light sensor, wherein there is a correspondence between the visible light image and the invisible light image;

the synthesis module 302 is configured to synthesize the visible light image and the invisible light image to create a first synthetic image;

the denoising module 303 is configured to denoise the visible light image and the first synthetic image; and the fusion module 304 is configured to fuse the denoised visible light image and the denoised first synthetic image to generate a second synthetic image.

With the embodiments of the present disclosure, a visible light image generated by a visible light sensor and an invisible light image generated by an invisible light sensor are obtained, wherein there is a correspondence between the visible light image and the invisible light image; a first synthetic image is created by synthesizing the visible light image and the invisible light image; the visible light image and the first synthetic image are denoised; and the denoised visible light image and the denoised first synthetic image are fused to generate a second synthetic image. Thus, the visible light image and the first synthetic image that is fused with the invisible light image are denoised respectively before the final image fusion to denoise the fused image.

Figure 4:
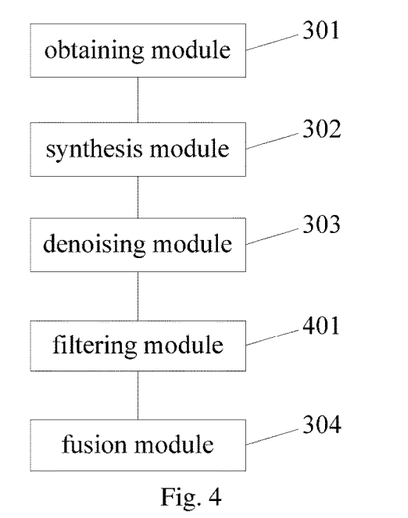
FIG. 4 is another schematic structure diagram of an image fusion device according to an embodiment of the present disclosure.

In a specific implementation, on the basis of the structure shown in FIG. 3, an image fusion device provided by an embodiment of the present disclosure may further include a filtering module 401, as shown in FIG. 4;

the filtering module 401 is configured to filter the denoised visible light image and the denoised first synthetic image respectively after denoising the visible light image and the first synthetic image; and wherein, the fusion module 304 is specifically configured to fuse the filtered visible light image and the filtered first synthetic image to generate the second synthetic image.

In a specific implementation, the filtering module 401 includes a first filtering unit and a second filtering unit;

the first filtering unit is configured to perform low pass filtering on the denoised visible light image to obtain an image corresponding to low frequency information;

the second filtering unit is configured to perform high pass filtering on the denoised first synthetic image to obtain an image corresponding to high frequency information; and wherein, the fusion module 304 is specifically configured to fuse the image corresponding to low frequency information and the image corresponding to high frequency information to generate the second synthetic image.

In a specific implementation, the synthesis module 302 is specifically configured to synthesize the invisible light image and the visible light image based on a first weight coefficient corresponding to the invisible light image and a second weight coefficient corresponding to the visible light image to create the first synthetic image.

In a specific implementation, the denoising module 303 includes a first determining unit and a first denoising unit;

the first determining unit is configured to determine a denoising control degree value for the visible light image and the first synthetic image according to the visible light image and the first synthetic image; and the first denoising unit is configured to denoise the visible light image and the first synthetic image respectively based on the determined denoising control degree value.

In a specific implementation, the denoising module 303 includes a second determining unit and a second denoising unit;

the second determining unit is configured to determine a denoising control degree value for the visible light image and the first synthetic image according to the first synthetic image; and the second denoising unit is configured to denoise the visible light image and the first synthetic image respectively based on the determined denoising control degree value.

In a specific implementation, the first determining unit includes a first determining subunit, a second determining subunit, and a third determining subunit;

the first determining subunit is configured to determine a first denoising weight value based on the visible light image and a preset denoising formula;

the second determining subunit is configured to determine the second denoising weight value based on the first synthetic image and the preset denoising formula; and the third determining subunit is configured to determine a denoising control degree value for the visible light image and the first synthetic image based on the first denoising weight value and the second denoising weight value.

In a specific implementation, the first determining unit includes an obtaining subunit, a judging subunit, a fourth determining subunit, and a fifth determining subunit;

the obtaining subunit is configured to obtain a first gain value of the visible light image and a second gain value of the first synthetic image;

the judging subunit is configured to judge whether the difference between the first gain value and the second gain value is greater than a predetermined threshold;

if the difference is not greater than the predetermined threshold, the fourth determining subunit is triggered; if the difference is greater than the predetermined threshold, the fifth determining subunit is triggered;

the fourth determining subunit is configured to determine a first denoising weight value based on the visible light image and a preset denoising formula, determine a second denoising weight value based on the first synthetic image and the preset denoising formula, and determine a denoising control degree value for the visible light image and the first synthetic image based on the first denoising weight value and the second denoising weight value; and the fifth determining subunit is configured to determine the second denoising weight value based on the first synthetic image and the preset denoising formula, and determine the second denoising weight value as the denoising control degree value for the visible light image and the first synthetic image.

In a specific implementation, the second determining unit is specifically configured to determine a third denoising weight value based on the first synthetic image and the preset denoising formula, and determining the third denoising weight value as the denoising control degree value for the visible light image and the first synthetic image.

In a specific implementation, the preset denoising formula is:

$$\text{weight}_{xy} = e^{\left[\frac{(f_{xy}-f_{ij})^2}{2*\hat{c}_1^2} - \frac{(x-i)^2+(y-j)^2}{2*\hat{c}_2^2}\right]};$$

wherein, $f_{xy}$ represents pixel value of a current pixel in the visible light image or in the first synthetic image to be denoised, x and y represent coordinates of the current pixel; $f_{ij}$ represents pixel value of a pixel in a preset neighborhood of the current pixel, i and j represent coordinates of the pixel in the preset neighborhood of the current pixel; $\delta_1$ and $\delta_2$ represent Gaussian distribution standard deviations.

In an implementation, formulas used in denoising the visible light image and the first synthetic image are:

$$W(x, y) = \frac{\sum_{-r}^{r}\sum_{-r}^{r} W(x+i, y+j) * \text{weight}(x+i, y+j)}{\sum_{-r}^{r}\sum_{-r}^{r} \text{weight}(x+i, y+j)};$$

$$VIS(x, y) = \frac{\sum_{-r}^{r}\sum_{-r}^{r} VIS(x+i, y+j) * \text{weight}(x+i, y+j)}{\sum_{-r}^{r}\sum_{-r}^{r} \text{weight}(x+i, y+j)};$$

wherein, r represents the radius of the preset neighborhood; W(x, y) represents the denoised first synthetic image, VIS(x, y) represents the denoised visible light image; x and y represent coordinates of a current pixel in the visible light image or in the first synthetic image to be denoised, W(x+i, y+j) represents pixel value of a pixel in the preset neighborhood of the current pixel in the first synthetic image; VIS(x+i, y+j) represents pixel value of a pixel in the preset neighborhood of the current pixel in the visible light image; weight(x+i, y+j) represents the denoising control degree value for the current pixel in the visible light image or in the first synthetic image.

Figure 5:
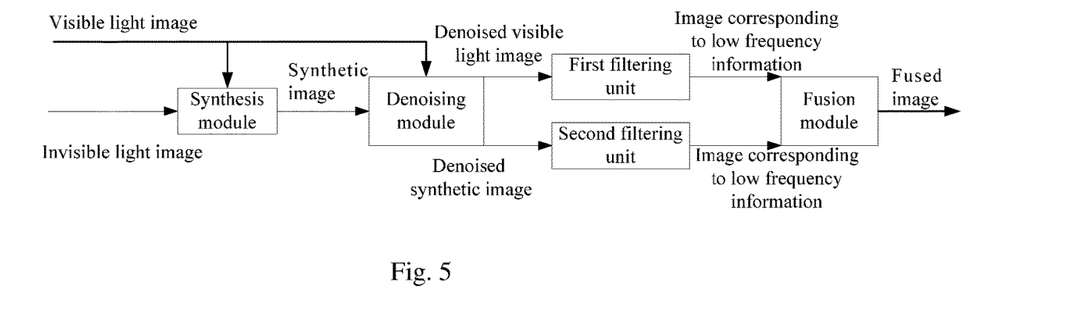
FIG. 5 is data flow diagram for image fusion by using the image fusion method provided by the embodiment of the present application.

FIG. 5 shows a data flow diagram for image fusion using the image fusion method provided by the embodiments of the present application. The obtained visible light image and the invisible light image are input into the synthesis module. The synthesis module synthesizes the visible light image and the invisible light image and output a synthetic image. The visible light image and the synthetic image are input into the denoising module respectively; and the denoising module denoises the visible light image and the synthetic image to generate and output a denoised visible light image and a denoised synthetic image respectively. The denoised visible light image is input into the first filtering unit, wherein the first filtering unit can perform low pass filtering on the denoised visible light image by using a low pass filtering means; and the low pass filtering means performs low pass filtering on the visible light image and output low frequency information. The denoised synthetic image is input into the second filtering unit, wherein the second filtering unit can perform high pass filtering on the denoised invisible light image by using a high pass filtering means; and the high pass filtering means performs high pass filtering on the synthetic image and output high frequency information. The low frequency information and the high frequency information are input into the fusion module and are fused to generate and output a fused image.

Figure 6:
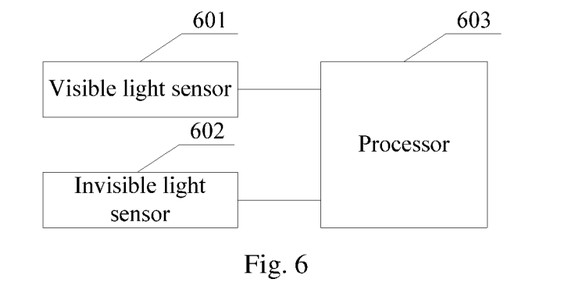
FIG. 6 is a schematic structure diagram of an image fusion system according to an embodiment of the present disclosure.

Corresponding to the embodiment of the method described above, an embodiment of the present disclosure further provides an image fusion system, as shown in FIG. 6, the system may include a visible light sensor 601, a invisible light sensor 602, and a processor 603;

the visible light sensor 601 is used for acquiring visible light signals and generating a visible light image based on the visible light signals;

the invisible light sensor 602 is used for acquiring invisible light signals and generating an invisible light image based on the invisible light signals;

the processor 603 is used for obtaining a visible light image generated by a visible light sensor and an invisible light image generated by an invisible light sensor, wherein there is a correspondence between the visible light image and the invisible light image; synthesizing the visible light image and the invisible light image to create a first synthetic image; denoising the visible light image and the first synthetic image; and fusing the denoised visible light image and the denoised first synthetic image to generate a second synthetic image.

With the embodiments of the present disclosure, a visible light image generated by a visible light sensor and an invisible light image generated by an invisible light sensor are obtained, wherein there is a correspondence between the visible light image and the invisible light image; a first synthetic image is created by synthesizing the visible light image and the invisible light image; the visible light image and the first synthetic image are denoised; and the denoised visible light image and the denoised first synthetic image are fused to generate a second synthetic image. Thus, the visible light image and the first synthetic image that is fused with the invisible light image are denoised respectively before the final image fusion to denoise the fused image.

Optionally, in a specific implementation, the processor 603 is further configured to filter the denoised visible light image and the denoised first synthetic image respectively after denoising the visible light image and the first synthetic image. Accordingly, the process of fusing, by the processor 603, the denoised visible light image and the denoised first synthetic image to generate a second synthetic image includes: fusing the filtered visible light image and the filtered first synthetic image to generate the second synthetic image.

Optionally, in a specific implementation, the process of filtering, by the processor 603, the denoised visible light image and the denoised first synthetic image respectively includes: performing low pass filtering on the denoised visible light image to obtain an image corresponding to low frequency information; performing high pass filtering on the denoised first synthetic image to obtain an image corresponding to high frequency information.

The process of fusing, by the processor 603, the filtered visible light image and the filtered first synthetic image to generate the second synthetic image includes: fusing the image corresponding to low frequency information and the image corresponding to high frequency information to generate the second synthetic image.

Optionally, in a specific implementation, the processor 603 is specifically configured to synthesize the invisible light image and the visible light image based on a first weight coefficient corresponding to the invisible light image and a second weight coefficient corresponding to the visible light image to create the first synthetic image.

Optionally, in a specific implementation, the processor 603 is specifically configured to: determine a denoising control degree value for the visible light image and the first synthetic image according to the visible light image and the first synthetic image; and; and denoise the visible light image and the first synthetic image respectively based on the determined denoising control degree value.

Optionally, in a specific implementation, the processor 603 is specifically configured to: determine a denoising control degree value for the visible light image and the first synthetic image according to the first synthetic image; and denoise the visible light image and the first synthetic image respectively based on the determined denoising control degree value.

Optionally, in a specific implementation, the processor 603 determining a denoising control degree value for the visible light image and the first synthetic image according to the visible light image and the first synthetic image includes:

determining a first denoising weight value based on the visible light image and a preset denoising formula;

determining a second denoising weight value based on the first synthetic image and the preset denoising formula; and determining the denoising control degree value for the visible light image and the first synthetic image based on the first denoising weight value and the second denoising weight value.

Optionally, in a specific implementation, the processor 603 determining a denoising control degree value for the visible light image and the first synthetic image according to the visible light image and the first synthetic image includes:

obtaining a first gain value of the visible light image and a second gain value of the first synthetic image;

judging whether the difference between the first gain value and the second gain value is greater than a predetermined threshold;

if the difference is not greater than the predetermined threshold, determining a first denoising weight value based on the visible light image and a preset denoising formula, determining a second denoising weight value based on the first synthetic image and the preset denoising formula, and determining a denoising control degree value for the visible light image and the first synthetic image based on the first denoising weight value and the second denoising weight value; and if the difference is greater than the predetermined threshold, determining the second denoising weight value based on the first synthetic image and the preset denoising formula, and determining the second denoising weight value as the denoising control degree value for the visible light image and the first synthetic image.

Optionally, in a specific implementation, the processor 603 determining a denoising control degree value for the visible light image and the first synthetic image according to the first synthetic image includes:

determining a third denoising weight value based on the first synthetic image and the preset denoising formula, and determining the third denoising weight value as the denoising control degree value for the visible light image and the first synthetic image.

Optionally, in an implementation, the preset denoising formula is:

$$weight_{xy} = e^{\left[\frac{(f_{xy}-f_{ij})^2}{2*\delta_1^2} - \frac{(x-i)^2+(y-j)^2}{2*\delta_2^2}\right]};$$

wherein, $f_{xy}$ represents pixel value of a current pixel in the visible light image or in the first synthetic image to be denoised, x and y represent coordinates of the current pixel; $f_{ij}$ represents pixel value of a pixel in a preset neighborhood of the current pixel, i and j represent coordinates of the pixel in the preset neighborhood of the current pixel; $\delta_1$ and $\delta_2$ represent Gaussian distribution standard deviations.

Optionally, in a specific implementation, formulas used in denoising the visible light image and the first synthetic image, are:

$$W(x, y) = \frac{\sum_{-r}^{r}\sum_{-r}^{r} W(x+i, y+j)*weight(x+i, y+j)}{\sum_{-r}^{r}\sum_{-r}^{r} weight(x+i, y+j)};$$

$$VIS(x, y) = \frac{\sum_{-r}^{r}\sum_{-r}^{r} VIS(x+i, y+j)*weight(x+i, y+j)}{\sum_{-r}^{r}\sum_{-r}^{r} weight(x+i, y+j)};$$

wherein, r represents the radius of the preset neighborhood; W(x, y) represents the denoised first synthetic image, VIS(x, y) represents the denoised visible light image; x and y represent coordinates of a current pixel in the visible light image or in the first synthetic image to be denoised, W(x+i, y+j) represents pixel value of a pixel in the preset neighborhood of the current pixel in the first synthetic image; VIS(x+i, y+j) represents pixel value of a pixel in the preset neighborhood of the current pixel in the visible light image; weight(x+i, y+j) represents the denoising control degree value for the current pixel in the visible light image or in the first synthetic image.

Figure 7:
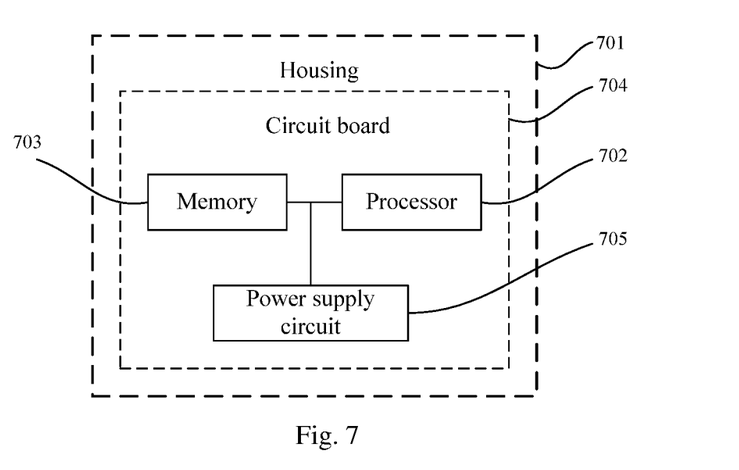
FIG. 7 is a schematic structure diagram of an electronic device according to an embodiment of the present application.

In another aspect, as shown in FIG. 7, an embodiment of the present disclosure provides an electronic device, including: a housing 701, a processor 702, a memory 703, a circuit board 704, and a power supply circuit 705, wherein the circuit board 704 is arranged inside the space enclosed by the housing 701, the processor 702 and the memory 703 are arranged on the circuit board 704; the power supply circuit 705 is configured to supply power for various circuits or elements of the electronic device; the memory 703 is used for storing executable codes; the processor 702 performs the following steps by executing the executable code stored on the memory:

obtaining a visible light image generated by a visible light sensor and an invisible light image generated by an invisible light sensor, wherein there is a correspondence between the visible light image and the invisible light image;

synthesizing the visible light image and the invisible light image to create a first synthetic image;

denoising the visible light image and the first synthetic image; and fusing the denoised visible light image and the denoised first synthetic image to generate a second synthetic image.

The processor of the electronic device reads the executable program code stored in the memory and runs the program corresponding to the executable program code. The program performs the image fusion method provided by the embodiment of the present disclosure at runtime. Thus, with the embodiments of the present disclosure, the aim of denoising fused images can be achieved.

In another aspect, an embodiment of the present disclosure provides executable program codes, which are executed to implement the image fusion method provided by the embodiments of the present disclosure, wherein the image fusion method may include:

obtaining a visible light image generated by a visible light sensor and an invisible light image generated by an invisible light sensor, wherein there is a correspondence between the visible light image and the invisible light image;

synthesizing the visible light image and the invisible light image to create a first synthetic image;

denoising the visible light image and the first synthetic image; and fusing the denoised visible light image and the denoised first synthetic image to generate a second synthetic image.

The executable program codes are executed to implement the image fusion method provided by the embodiments of the present disclosure at runtime. Thus, with the embodiments of the present disclosure, the aim of denoising the fused images can be achieved.

In another aspect, an embodiment of the present disclosure provides a storage medium for storing executable program codes, which are executed to implement the image fusion method provided by the embodiments of the present disclosure, wherein the image fusion method may include:

obtaining a visible light image generated by a visible light sensor and an invisible light image generated by an invisible light sensor, wherein there is a correspondence between the visible light image and the invisible light image;

synthesizing the visible light image and the invisible light image to create a first synthetic image;

denoising the visible light image and the first synthetic image; and fusing the denoised visible light image and the denoised first synthetic image to generate a second synthetic image.

The storage medium stores the application program for performing, at runtime, the image fusion method provided by the embodiment of the present disclosure. Thus, with the embodiments of the present disclosure, the aim of denoising the fused images can be achieved.

For embodiments of the system/device, since they are similar to embodiments of the method, the description thereof is relatively simple; the relating parts could refer to the parts of the description of the embodiments of the method.

It should be noted that the relationship terms herein such as "first", "second" and the like, if any, are only used for distinguishing one entity or operation from another entity or operation, but do not necessarily require or imply that there is actual relationship or order between these entities or operations. Moreover, the terms "include", "comprise" or any other variants thereof are intended to cover a non-exclusive inclusion, so that processes, methods, articles, or devices including a series of elements include not only those elements listed but also those not specifically listed or elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which include these elements.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

Embodiments described above are just preferred embodiments of the present invention, and not intended to limit the scope of the present invention. Any modifications, equivalent, improvement or the like within the spirit and principle of the present disclosure should be included in the scope of the present disclosure.

The invention claimed is:

1. An image fusion method, comprising:
    obtaining a visible light image generated by a visible light sensor and an invisible light image generated by an invisible light sensor, wherein there is a correspondence between the visible light image and the invisible light image;
    synthesizing the visible light image and the invisible light image to create a first synthetic image;
    denoising the visible light image and the first synthetic image; and
    fusing the denoised visible light image and the denoised first synthetic image to generate a second synthetic image.

2. The method of claim 1, wherein after denoising the visible light image and the first synthetic image, the method further comprises:
    filtering the denoised visible light image and the denoised first synthetic image respectively;
    fusing the denoised visible light image and the denoised first synthetic image to generate a second synthetic image comprises:
    fusing the filtered visible light image and the filtered first synthetic image to generate the second synthetic image.

3. The method of claim 2, wherein filtering the denoised visible light image and the denoised first synthetic image respectively comprises:
    performing low pass filtering on the denoised visible light image to obtain an image corresponding to low frequency information;
    performing high pass filtering on the denoised first synthetic image to obtain an image corresponding to high frequency information;
    fusing the filtered visible light image and the filtered first synthetic image to generate the second synthetic image comprises:
    fusing the image corresponding to low frequency information and the image corresponding to high frequency information to generate the second synthetic image.

4. The method of claim 1, wherein synthesizing the visible light image and the invisible light image to create a first synthetic image comprises:
    synthesizing the invisible light image and the visible light image based on a first weight coefficient corresponding to the invisible light image and a second weight coefficient corresponding to the visible light image to create the first synthetic image.

5. The method of claim 1, wherein denoising the visible light image and the first synthetic image comprises:
    determining a denoising control degree value for the visible light image and the first synthetic image according to the visible light image and the first synthetic image; and
    denoising the visible light image and the first synthetic image respectively based on the determined denoising control degree value.

6. The method of claim 1, wherein denoising the visible light image and the first synthetic image comprises:
    determining a denoising control degree value for the visible light image and the first synthetic image according to the first synthetic image; and
    denoising the visible light image and the first synthetic image respectively based on the determined denoising control degree value.

7. The method of claim 5, wherein determining a denoising control degree value for the visible light image and the first synthetic image according to the visible light image and the first synthetic image comprises:
    determining a first denoising weight value based on the visible light image and a preset denoising formula;
    determining a second denoising weight value based on the first synthetic image and the preset denoising formula; and determining the denoising control degree value for the visible light image and the first synthetic image based on the first denoising weight value and the second denoising weight value.

8. The method of claim 5, wherein determining a denoising control degree value for the visible light image and the first synthetic image according to the visible light image and the first synthetic image comprises:
   obtaining a first gain value of the visible light image and a second gain value of the first synthetic image;
   judging whether the difference between the first gain value and the second gain value is greater than a predetermined threshold;
   if the difference is not greater than the predetermined threshold, determining a first denoising weight value based on the visible light image and a preset denoising formula, determining a second denoising weight value based on the first synthetic image and the preset denoising formula, and determining a denoising control degree value for the visible light image and the first synthetic image based on the first denoising weight value and the second denoising weight value; and
   if the difference is greater than the predetermined threshold, determining the second denoising weight value based on the first synthetic image and the preset denoising formula, and determining the second denoising weight value as the denoising control degree value for the visible light image and the first synthetic image.

9. The method of claim 6, wherein determining a denoising control degree value for the visible light image and the first synthetic image according to the first synthetic image comprises:
   determining a third denoising weight value based on the first synthetic image and the preset denoising formula, and determining the third denoising weight value as the denoising control degree value for the visible light image and the first synthetic image.

10. An image fusion system, comprising: a visible light sensor, an invisible light sensor, and a processor; wherein,
   the visible light sensor is used for acquiring visible light signals and generating a visible light image based on the visible light signals;
   the invisible light sensor is used for acquiring invisible light signals and generating an invisible light image based on the invisible light signals;
   the processor is used for obtaining a visible light image generated by a visible light sensor and an invisible light image generated by an invisible light sensor, wherein there is a correspondence between the visible light image and the invisible light image; synthesizing the visible light image and the invisible light image to create a first synthetic image; denoising the visible light image and the first synthetic image; and fusing the denoised visible light image and the denoised first synthetic image to generate a second synthetic image.

11. An electronic device, comprising: a housing, a processor, a memory, a circuit board and a power supply circuit, wherein, the circuit board is arranged inside a space enclosed by the housing, the processor and the memory are arranged on the circuit board; the power supply circuit is configured to supply power for various circuits or elements of the electronic device; the memory is configured to store executable program codes; the processor performs the following steps by executing the executable code stored on the memory:
   obtaining a visible light image generated by a visible light sensor and an invisible light image generated by an invisible light sensor, wherein there is a correspondence between the visible light image and the invisible light image;
   synthesizing the visible light image and the invisible light image to create a first synthetic image;
   denoising the visible light image and the first synthetic image; and
   fusing the denoised visible light image and the denoised first synthetic image to generate a second synthetic image.

12. A non-transitory storage medium, wherein the storage medium is used for storing executable program codes, which are executed to implement the image fusion method of claim 1.

* * * * *